US006234383B1

(12) United States Patent
Harmat et al.

(10) Patent No.: US 6,234,383 B1
(45) Date of Patent: May 22, 2001

(54) METHOD AND APPARATUS FOR CIRCUMFERENTIAL APPLICATION OF MATERIALS TO AN INTERIOR SURFACE OF A CURVED PIPE

(75) Inventors: Fred Harmat; Graeme Van Dongen, both of Edmonton (CA)

(73) Assignee: Almac Machine Works Ltd., Edmonton (CA)

( * ) Notice: Subject to any disclaimer, the term of this patent is extended or adjusted under 35 U.S.C. 154(b) by 0 days.

(21) Appl. No.: 09/413,038

(22) Filed: Oct. 6, 1999

(30) Foreign Application Priority Data

Sep. 14, 1999 (CA) .................................................. 2282134

(51) Int. Cl.[7] .............................. B23K 1/18; B23K 37/04
(52) U.S. Cl. ......................... 228/254; 228/38; 228/44.5; 228/44.3
(58) Field of Search ..................................... 228/254, 212, 228/38, 44.3, 44.5, 49.3; 248/49; 219/60 A

(56) References Cited

U.S. PATENT DOCUMENTS 3,585,345 * 6/1971 Jespersen .
4,134,607 * 1/1979 Koski .
4,629,109 * 12/1986 Matsushita .
4,948,027 * 8/1990 Yamashita et al. .

OTHER PUBLICATIONS

Product brochure for Indulay® abrasion resistant chromium carbide welded overlay for piping products, Indutech Industrial Technology, Indutech Canada Limited, Calgary, Alberta, Canada, 4 pages, date prior to Sep. 14, 1999.
Product brochure for Brospec Fusionbond Plate and Pipe, Brospec Inc., Quebec, Canada, 12 pages, date prior to Sep. 14, 1999.
Product brochure for CF Ultra Tech Abrasion Resistant Piping Systems, CF Ultra Tech Inc., Grafton, Wisconsin, U.S.A., 4 pages, date prior to Sep. 14, 1999.

* cited by examiner

Primary Examiner—Patrick Ryan
Assistant Examiner—Jonathan Johnson
(74) Attorney, Agent, or Firm—Christensen O'Connor Johnson Kindness PLLC

(57) ABSTRACT

A method and apparatus for circumferential application of materials to an interior surface of a curved pipe includes providing a pipe support with a rotational axis. A curved section of pipe is mounted to the pipe support. An arm supporting an applicator head is positioned within the curved section of pipe. The pipe support is rotated about the rotational axis, while coordinating movement of the arm to maintain the applicator head in a working position within the curved section of pipe.

23 Claims, 21 Drawing Sheets

VIEW A

METHOD AND APPARATUS FOR CIRCUMFERENTIAL APPLICATION OF MATERIALS TO AN INTERIOR SURFACE OF A CURVED PIPE

FIELD OF THE INVENTION

The present invention relates to a method and an apparatus for circumferential application of materials to an interior surface of a curved pipe

BACKGROUND OF THE INVENTION

There are various applications in which a circumferential application of materials to an interior surface of a pipe is preferred. For example, circumferential welding of overlay materials to an interior surface of a pipe is preferred, as fluids tend to flow along longitudinal welds and accelerate wear. It is relatively easy to circumferentially weld a section of straight pipe. When the section of pipe is curved, positioning a circumferential weld along the interior surface of the pipe becomes extremely difficult.

At the present time there is no cost effective method for positioning a circumferential weld along the interior surface of a curved section of pipe. Welds are, therefore, positioned longitudinally. In addition to accelerated wear, fit problems have been encountered due to differences in shrinkage between straight sections of pipe welded circumferentially and curved sections of pipe welded longitudinally.

SUMMARY OF THE INVENTION

What is required is a method and an apparatus for circumferential application of materials to an interior surface of a curved pipe.

According to one aspect of the present invention there is provided a method for circumferential application of materials to an interior surface of a curved pipe which includes the following steps. A pipe support is provided with a rotational axis. A curved section of pipe is mounted to the pipe support. A arm supporting an applicator head is positioned within the curved section of pipe. The pipe support is rotated about the rotational axis, while coordinating movement of the arm to maintain the applicator head in a working position within the curved section of pipe.

Although beneficial results may be obtained through the method, as described above, even more beneficial results may be obtained when the further step is taken of varying the rotational speed of the pipe support to control the rate of application or deposition of materials being applied.

Although beneficial results may be obtained through the use of the method, as described above, even more beneficial results may be obtained when the further step is taken of oscillating the applicator head and varying the oscillating amplitude of the applicator head to compensate for differences in length of curvature of the pipe.

According to another aspect of the invention there is provided an apparatus for circumferential application of materials to an interior surface of a curved pipe which includes a base and a pipe support mounted to the base for rotation about a rotational axis. The pipe support has a cavity adapted to receive a curved section of pipe. An arm extends into the cavity of the pipe support. An applicator head is mounted to the arm. A rotational drive is provided which is adapted to rotate the pipe support about the rotational axis. A controller is provided which is adapted to coordinate movement of the arm with the rotational positioning of the pipe support.

Although beneficial results may be obtained through the use of the apparatus, as described above, even more beneficial results may be obtained when the controller also coordinates the position of the applicator head with the rotational positioning of the pipe support. There are various ways to control the position of the applicator head there will hereinafter be further described a linkage which extends through the arm to the applicator head. The flexible linkage is adapted to control orientation of the applicator head.

Although beneficial results may be obtained through the use of the apparatus, as described above, even more beneficial results may be obtained when the pipe support includes longitudinal guides and a guidance source adapted to move a curved section of pipe along the longitudinal guides. It is difficult to coordinate this movement with the pipe support rotating. There will hereinafter be described a longitudinal guidance source which applies a linear pulling force and longitudinal guides which provide an arcuate guide path to compensate for the curvature of the pipe.

Although beneficial results may be obtained through the apparatus, as described above, even more beneficial results may be obtained when the applicator head oscillates and the amplitude of oscillation is variable. This allows the applicator head to compensate for differences in the length of curvature of the pipe. There will hereinafter be further described an oscillation control mechanism in which such oscillations are controlled by a movable sensor oscillating between a pair of angularly offset rotating swash plates carried by the rotating pipe support. The movable sensor has a master to slave relationship with an oscillating drive for the applicator head.

BRIEF DESCRIPTION OF THE DRAWINGS

These and other features of the invention will become more apparent from the following description in which reference is made to the appended drawings, wherein.

DETAILED DESCRIPTION OF THE PREFERRED EMBODIMENT

Figure 1:
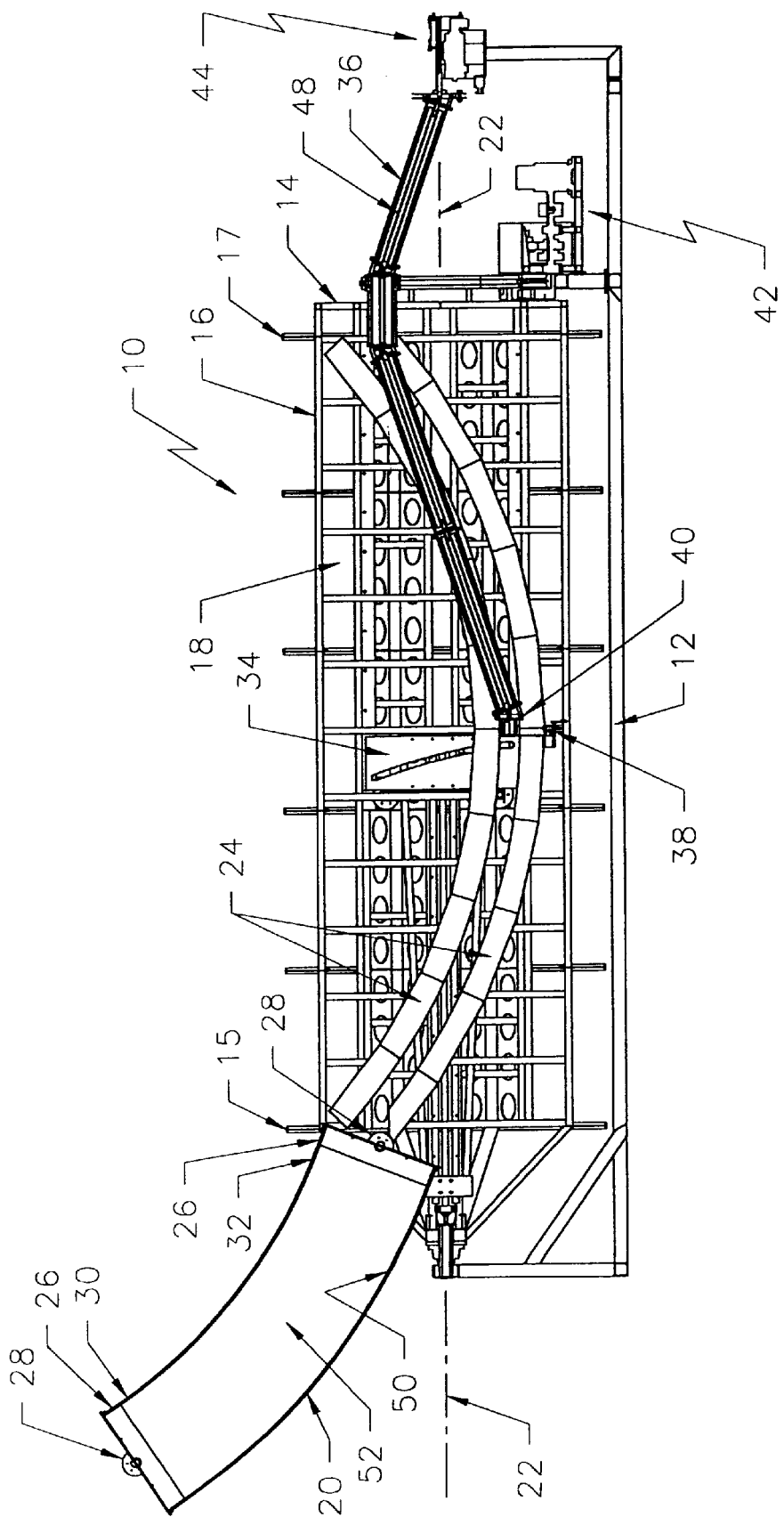
FIG. 1 is a side view, in section, of an apparatus for circumferential application of materials to an interior surface of a curved pipe with a curved pipe in position to be mounted onto the pipe support.

The preferred embodiment, an apparatus for circumferential application of materials to an interior surface of a curved pipe generally identified by reference numeral 10, will now be described with reference to FIGS. 1 through 22.

Figure 15:
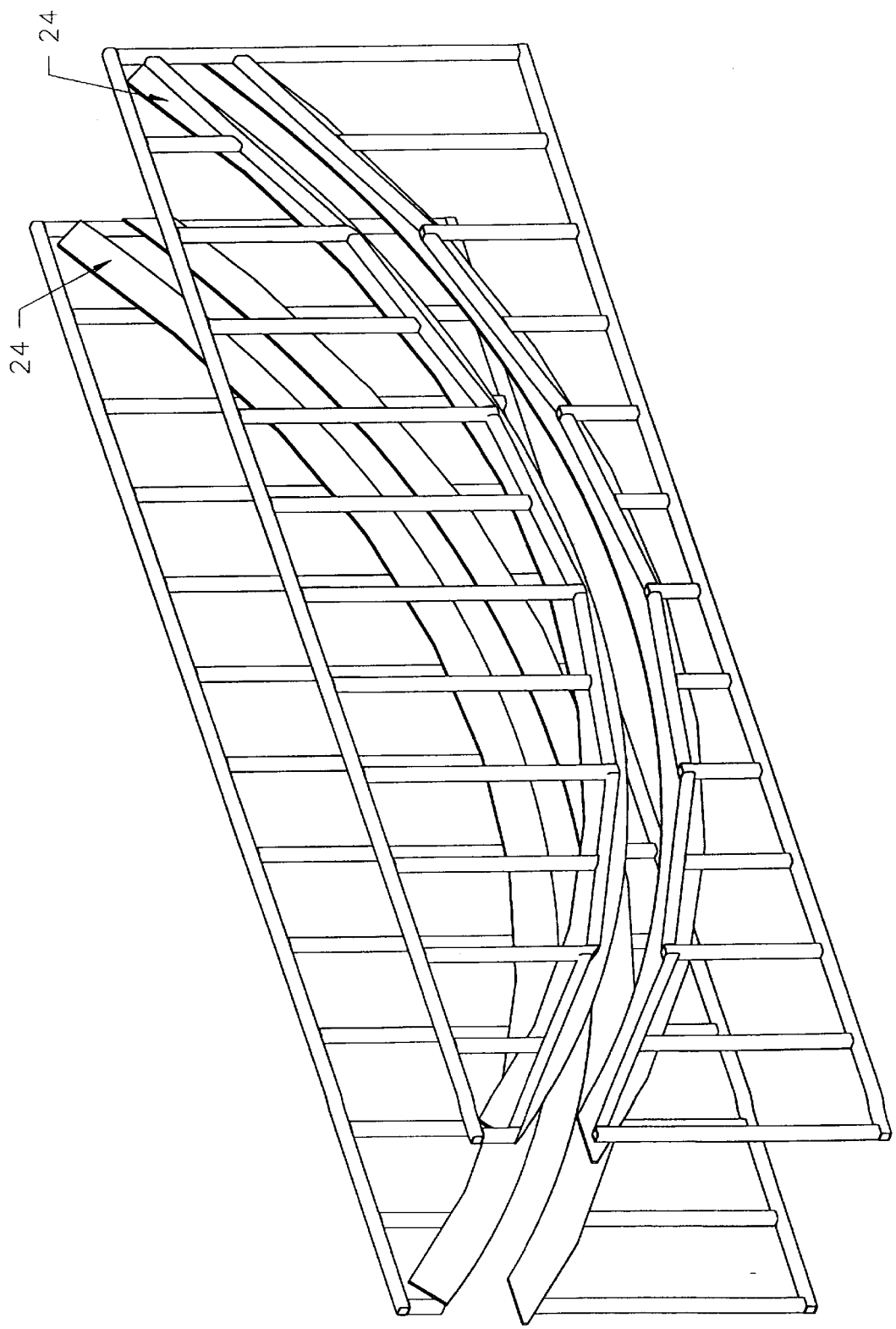
FIG. 15 is a detailed perspective view of the longitudinal guides illustrated in FIG. 1.
Figure 17:
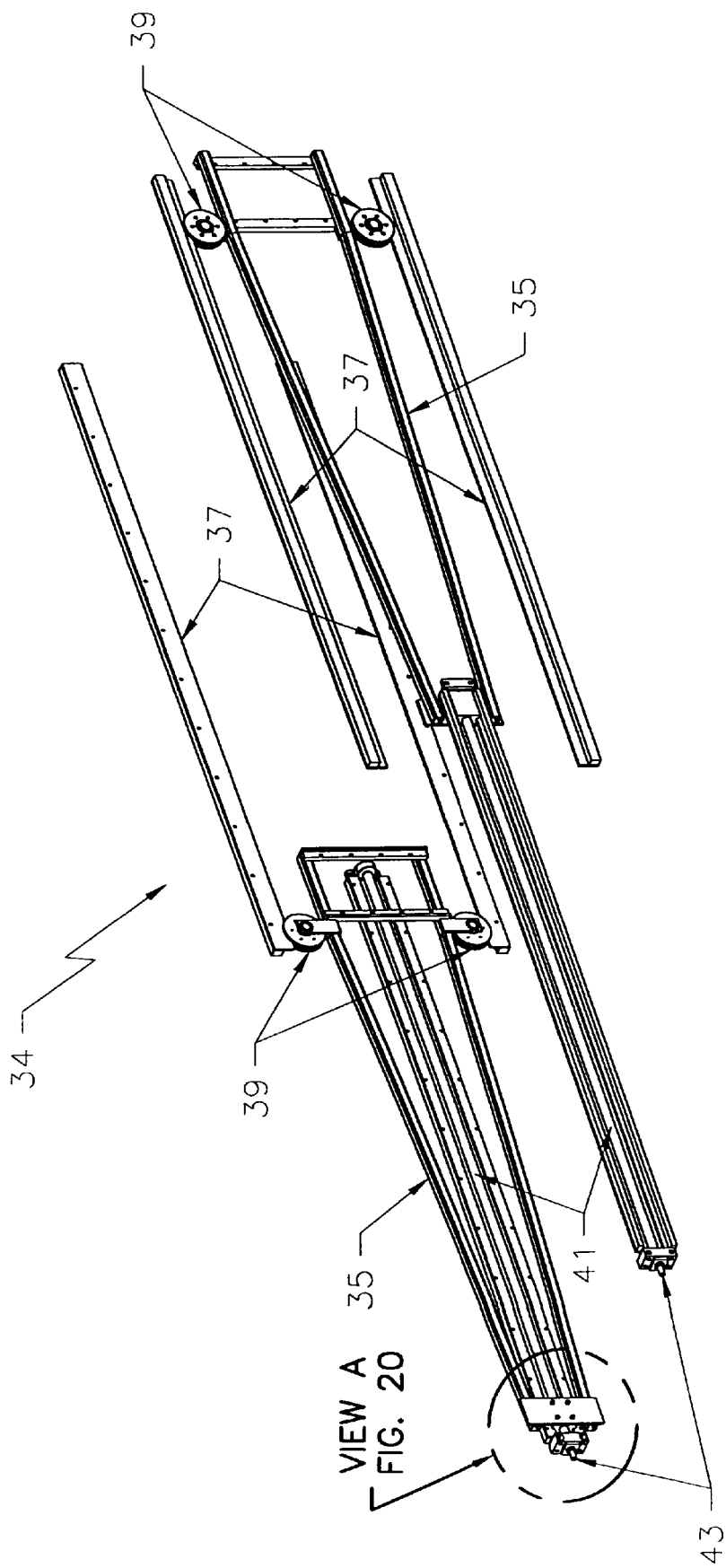
FIG. 17 is a detailed perspective view of the longitudinal guidance system illustrated in FIG. 1.
Figure 18:
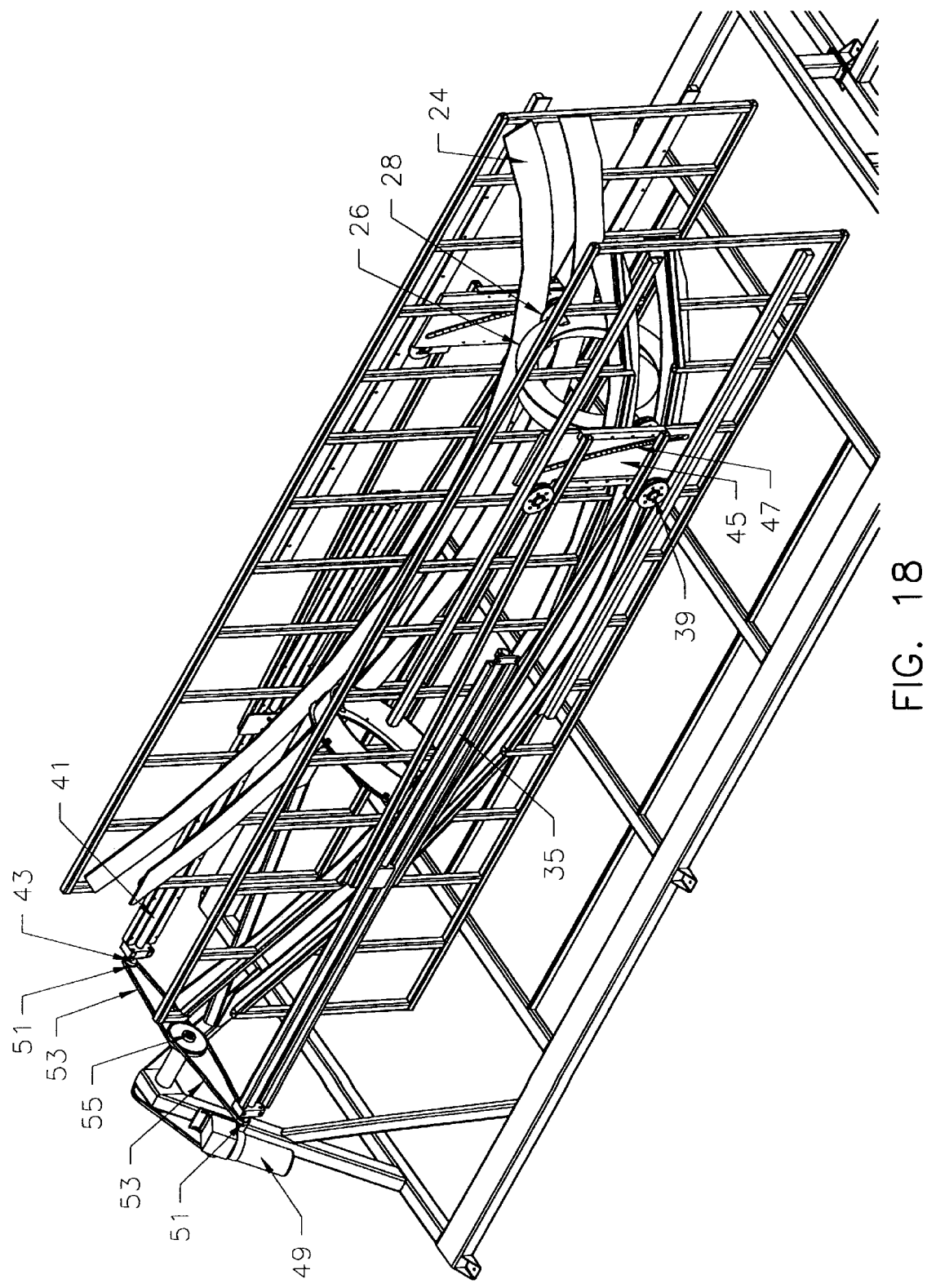
FIG. 18 is a detailed perspective view of movable members, engaged in the longitudinal guides and guided by the longitudinal guidance system.
Figure 19:
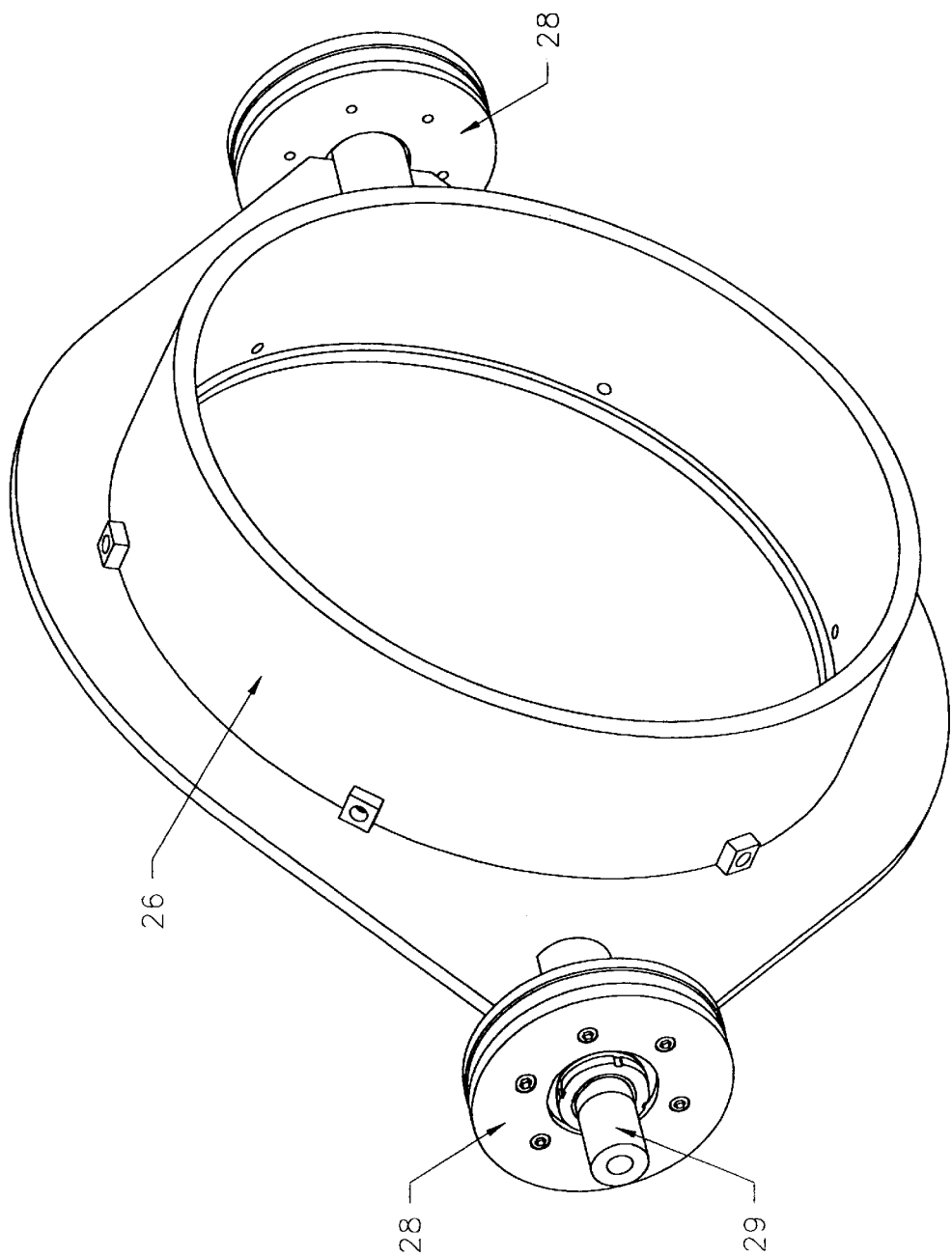
FIG. 19 is a perspective view of one of the movable members illustrated in FIG. 1.
Figure 20:
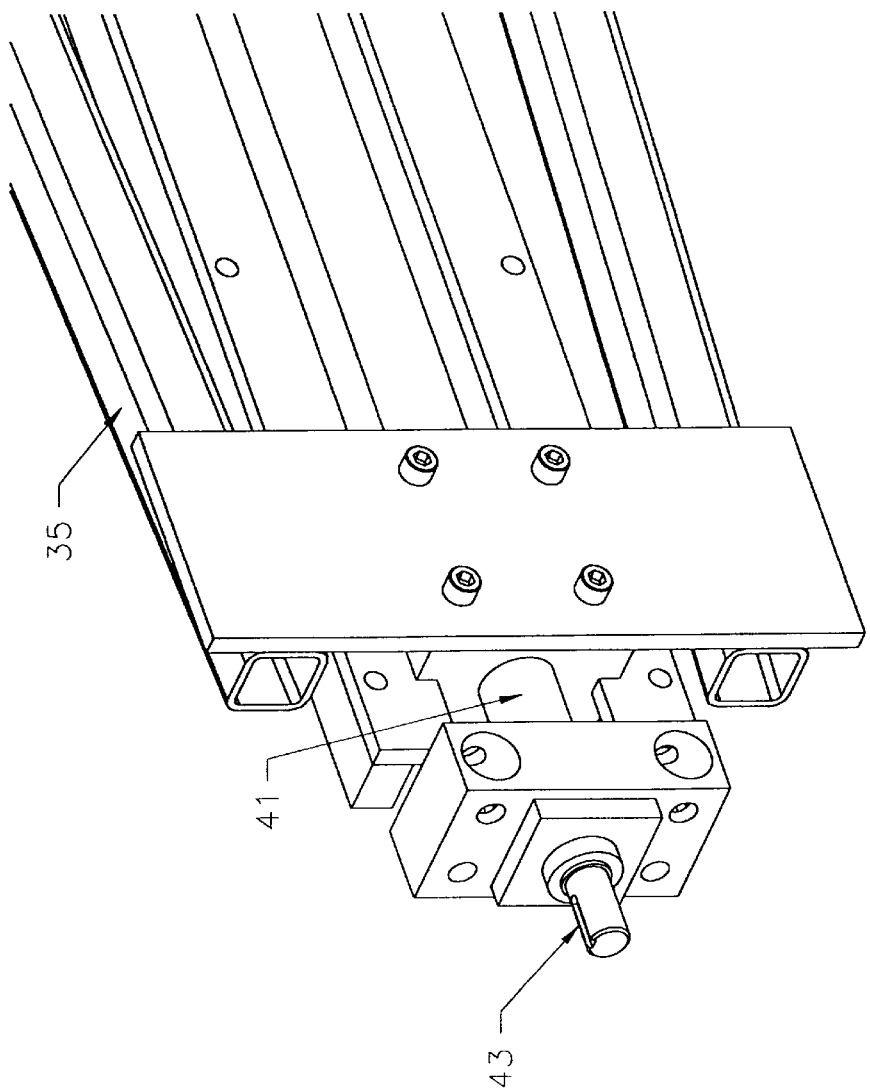
FIG. 20 is a detailed perspective view of a drive connection for the longitudinal guidance system illustrated in FIG. 18.

Referring to FIG. 1, apparatus 10 includes a base 12 and a pipe support 14. Pipe support 14 has a first end 15, a second end 17, a cylindrical frame 16 and a central cavity 18 adapted to receive a curved section of pipe 20. Pipe 20 has a first end 30, a second end 32 and an interior surface 50 defining an interior passage 52 of pipe 20. Pipe support 14 is mounted to base 12 for rotation about a rotational axis indicated by broken line 22. Opposed longitudinal guide tracks 24 are positioned along central cavity 18 of pipe support 14. Referring to FIG. 15, guide tracks 24 come as a removable assembly. A different guide track 24 is required for each differing curvature of pipe. The appropriate guide track 24 is installed in apparatus 10 prior to use. Referring to FIG. 1, movable members having the form of collars 26 are secured to each of first end 30 and second end 32 of pipe 20. There are various ways to secure collars 26 to pipe 20. The manner used with the proto-type of apparatus 10 was by temporarily welding collars 26 to pipe 20. Referring to FIG. 19, collars 26 are equipped with guide wheels 28 that engage opposed guide tracks 24 and have projecting guide pins 29. Referring to FIG. 1, a guidance source 34 is adapted to move collars 26 along opposed guide tracks 24. Referring to FIG. 17, guidance source 34 includes two telescopically expandable guide members 35 and two spaced pairs of parallel rails 37. Each of guide members 35 have guide wheels 39 which engage parallel rails 37. Telescopic expansion and contraction of guide members is governed by a drive screw 41. Referring to FIG. 20, drive screw 41 is rotated by engaging it's remote end 43. Referring to FIG. 18, each of guide members 35 have an attachment plate 45 with an opening 47. Referring to FIG. 18, there is illustrated the interrelationship between collars 26, guide tracks 24, and guidance source 34. Wheels 28 of collars 26 engage guide tracks 24. Pins 29 on one of collars 26, engages opening 47 on attachment plate 45 of guide members 35 of guidance source 34. A reversible drive motor 49 is provided which rotates a drive pulley 51 mounted at remote end 43 of one of drive screws 41. Drive pulley 51 is coupled by belts or chains 53 with an idler pulley 55 which, in-turn is coupled to a drive pulley 51 for the other of drive screws 41. Through the described mechanism, drive motor 49 provides the force to rotate both drive screws 41. When drive motor 49 rotates drive screws 41 in a first direction guide members 35 expand. When drive motor 49 rotates in a second direction guide members 35 contract. Movement of guide members 35 is always in a linear direction with wheels 39 of guide members 35 engaging rails 37. In the proto-type pulley 55 was non-rotatably fixed to base frame 12. This enabled the rotation of pipe support 14 to impart rotation to pulleys 51 by means of belts or chains 53. This provided an advantage of enabling drive screws 41 to cause guide members 35 to feed at a rate that was tied to the rotational speed of pipe support 14 and determined by the ratio of pulley 55 and pulleys 51 and the lead of drive screw 41. Variation of the feed rate could be affected by changing the ratio of pulley 55 and pulleys 51 or by changing drive screw 41. In the proto-type, variation of this rate was achieved by selectively rotating drive motor 49. For example, when positioning the pipe on apparatus 10 in preparation for welding it proved to be considerably faster to utilize drive motor 49 rather than rely upon rotation of pipe support 14. It must be remembered that while pipe support 14 rotates, guidance source 34 is only capable of providing a linear pulling force along rails 37. Longitudinal guide rails 24 provide an arcuate guide path which is selected to compensate for the curvature of the pipe. Referring to FIG. 18, opening 47 in attachment plate 45 is configured to compensate for the uniform angular feed of the pipe along its curvature, while utilizing the uniform linear feed of guide members 35. A different attachment plate 45 with a different configuration of opening 47 is required for each different curvature of pipe.

Figure 14:
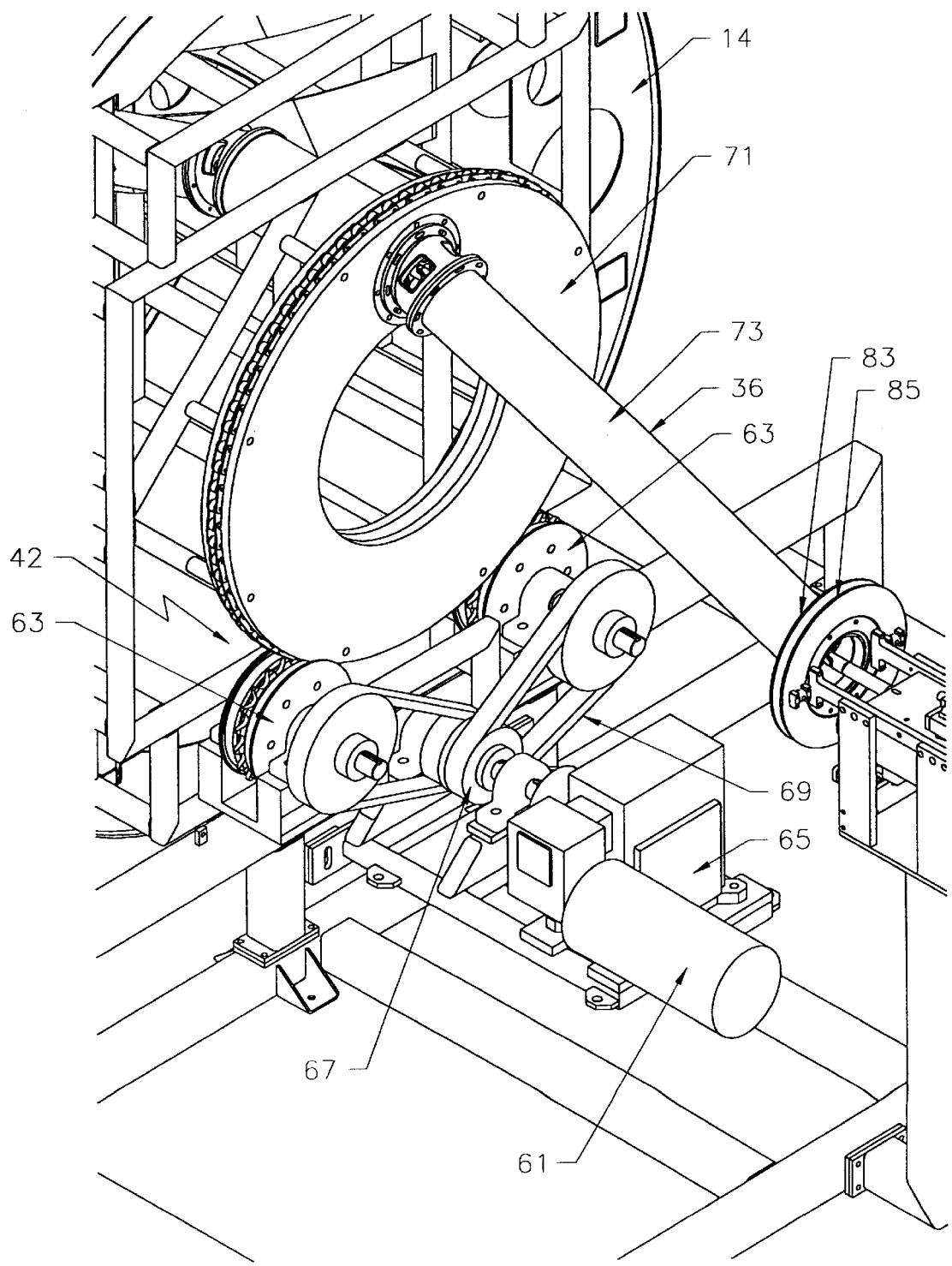
FIG. 14 is a detailed perspective view of the rotational drive for the pipe support illustrated in FIG. 1.

Referring to FIG. 1, an arm 36 extends into cavity 18 of pipe support 14. An applicator head, such as welding head 38 is pivotally mounted to a remote end 40 of arm 36. A rotational drive 42 is provided that is adapted to rotate pipe support 14 about rotational axis 22. Referring to FIG. 14, rotational drive 42 includes a drive motor 61 which drives a pair of spaced driven sprockets 63. Drive motor 61 utilizes a gear reduction unit 65. Drive motor 61 is coupled by a driven gear 67 and chain coupling 69 to driven sprockets 63. Driven sprockets 63, in turn, engage a gear sprocket 71 on pipe support 14 to impart a rotational force to pipe support 14. An exterior housing 73 for moveable arm 36 extends eccentrically through gear sprocket 71. Exterior housing 73 moves in an eccentric fashion with the rotation of gear sprocket 71, in a fashion that bears a resemblance to the movement of a skipping rope. It should be noted that the internal workings and connections of moveable arm 36 remain stationary. This connection serves as part of a control linkage, generally indicated on FIGS. 1 through 4, by reference numeral 44, that serves to maintain the correct rotational positioning of arm 36 as pipe support 14 rotates.

Figure 13:
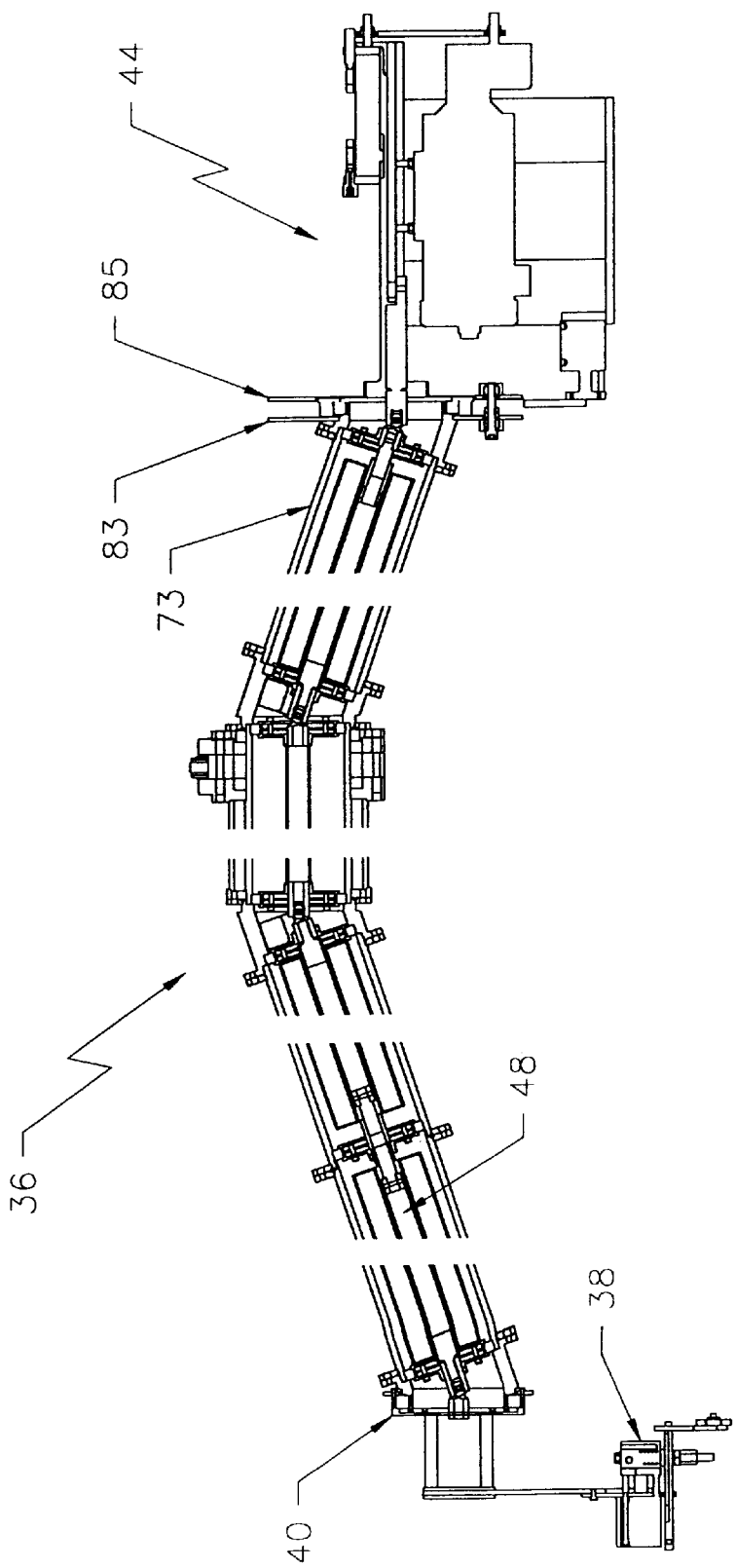
FIG. 13 is a detailed side elevation view, in section, of the arm illustrated in FIG. 1.
Figure 16:
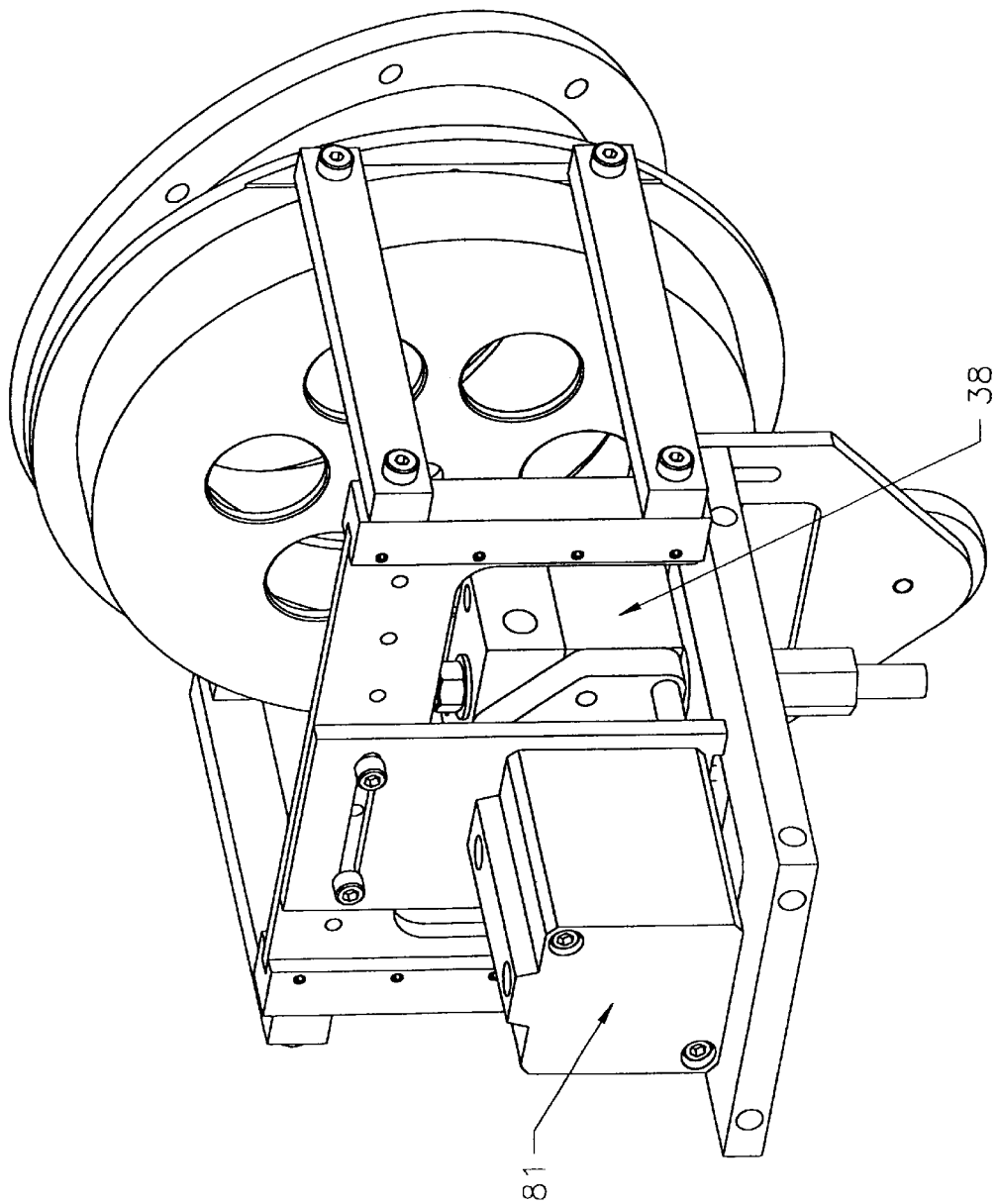
FIG. 16 is a detailed perspective view of the applicator head illustrated in FIG. 1.
Figure 22:
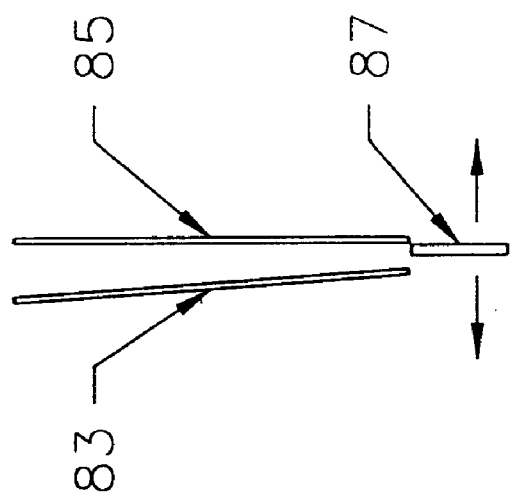
FIG. 22 is a detailed side elevation view, in section, of a control system for the oscillation of the applicator head, with swash plates in a second rotational position.
Figure 21:
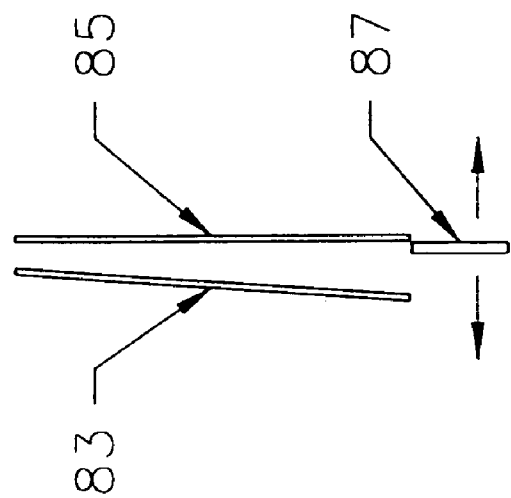
FIG. 21 is a detailed side elevation view, in section, of a control system for the oscillation of the applicator head, with swash plates in a first rotational position.

Referring to FIG. 13, a flexible drive linkage 48 extends through arm 36 to welding head 38. Flexible drive linkage 48 is adapted to provide control over the orientation of welding head 38. In most welding applications that selected orientation will be a vertical orientation, without regard to the rotational position of pipe support 14, as can be seen from a review of FIGS. 5 through 12. Referring to FIG. 16, it is preferred that applicator head 38 oscillate and for that purpose an oscillating drive 81 is provided. Referring to FIG. 14, positioned at a remote end of arm 36 are a pair of swash plates 83 and 85. Swash plates 83 and 85 rotate with exterior housing 73 that covers arm 36. Swash plates 83 and 85 are angularly offset to reflect the angular positioning of exterior housing 73. Referring to FIG. 21 and 22, the oscillations of applicator head 38 is controlled by a movable sensor 87 oscillating between angularly offset rotating swash plates 83 and 85. As can be seen by a comparison of FIGS. 21 and 22, the angular offset of swash plates 83 and 85 means that as they rotate the space available between them for oscillating movement of movable sensor 87 varies. On the proto-type oscillating drive 81, illustrated in FIG. 16 was hydraulically operated. By creating a master to slave relationship between movable sensor 87 and oscillating drive 81, the oscillations of applicator head 38 were made to duplicate the oscillations of movable sensor 87.

Figure 2:
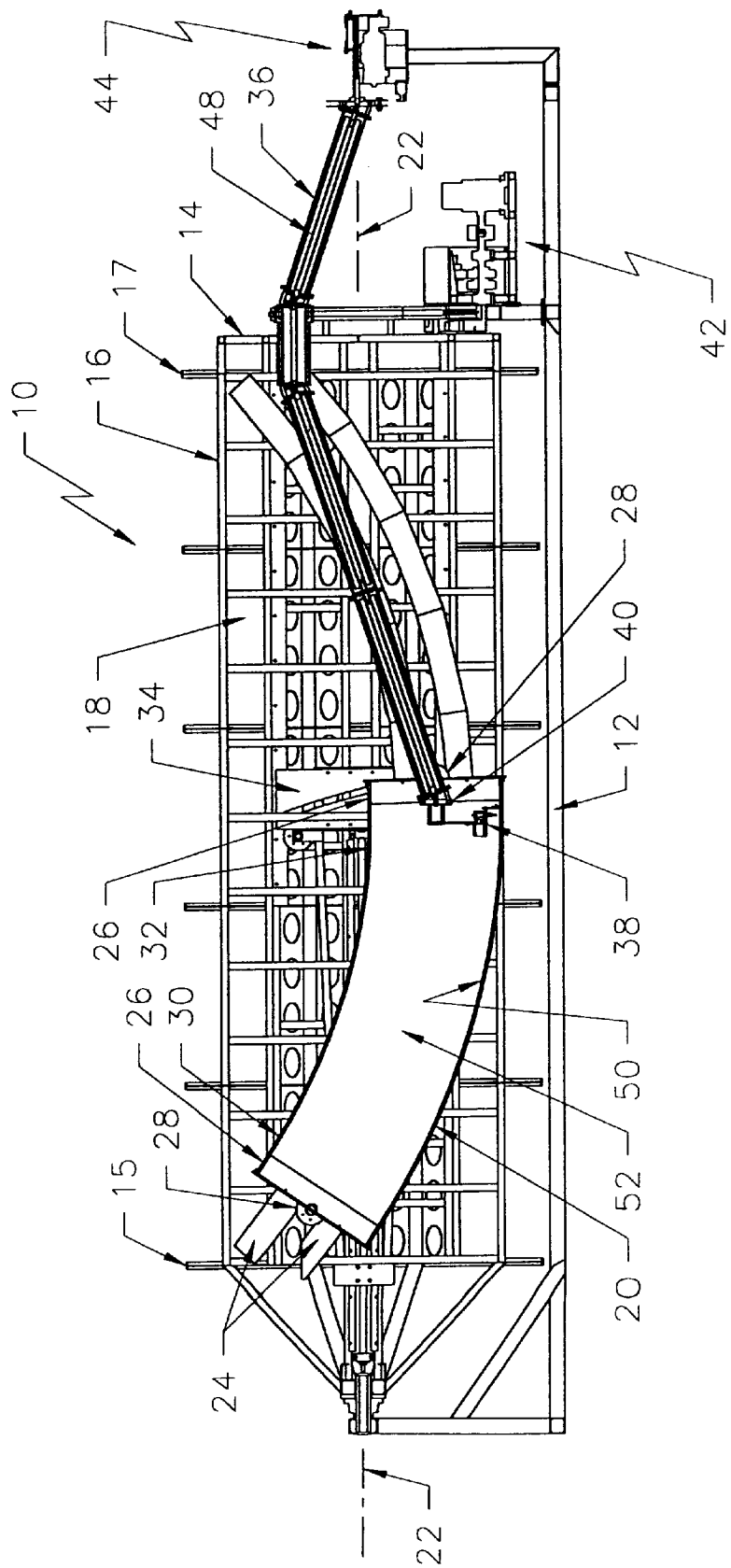
FIG. 2 is a side view in section of the apparatus for circumferential application of materials to an interior surface of the curved pipe shown in FIG. 1, with the curved pipe in position for starting circumferential welding of overlay materials to the interior surface of the curved pipe.
Figure 3:
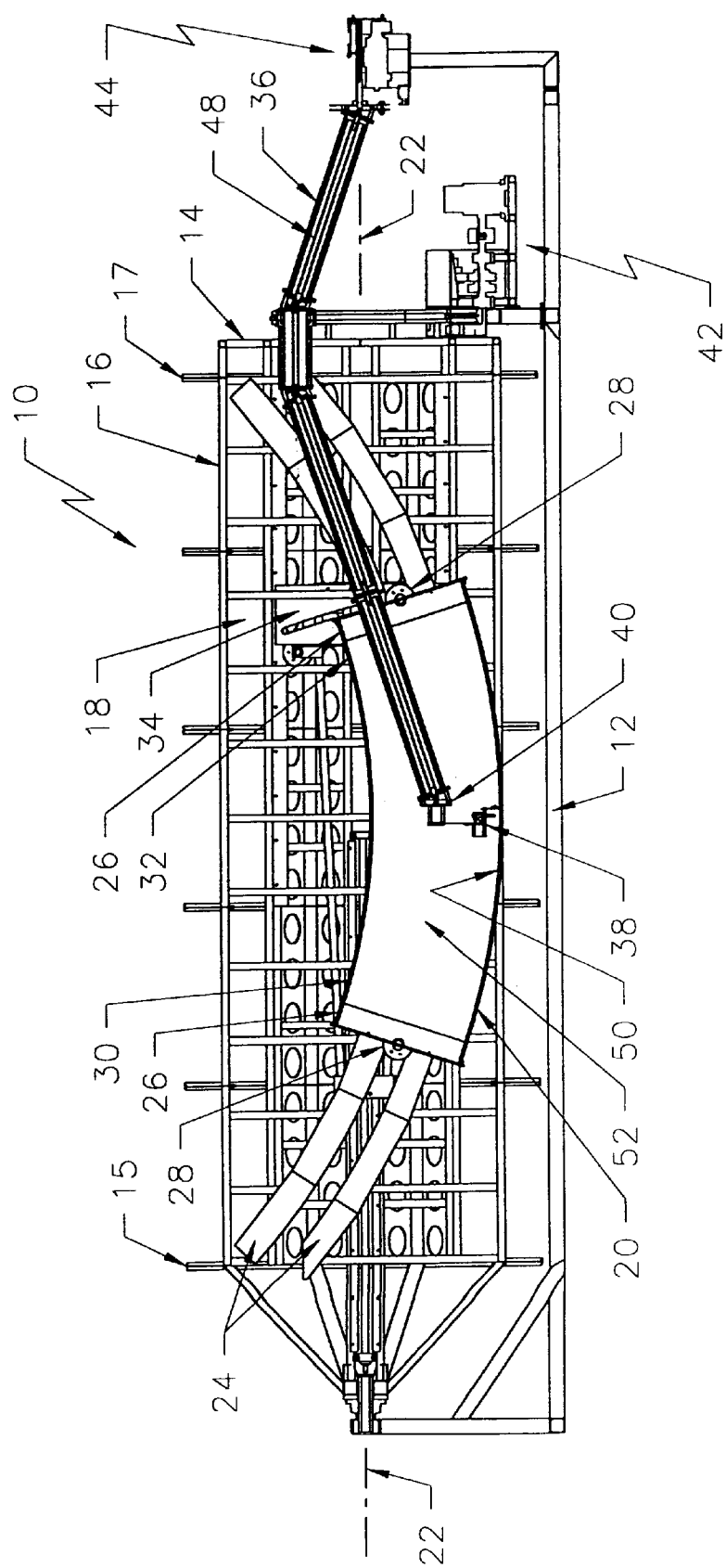
FIG. 3 is a side view in section of the apparatus for circumferential application of materials to the interior surface of the curved pipe shown in FIG. 1, in the process of circumferential welding of overlay materials to an interior surface of the curved pipe.
Figure 4:
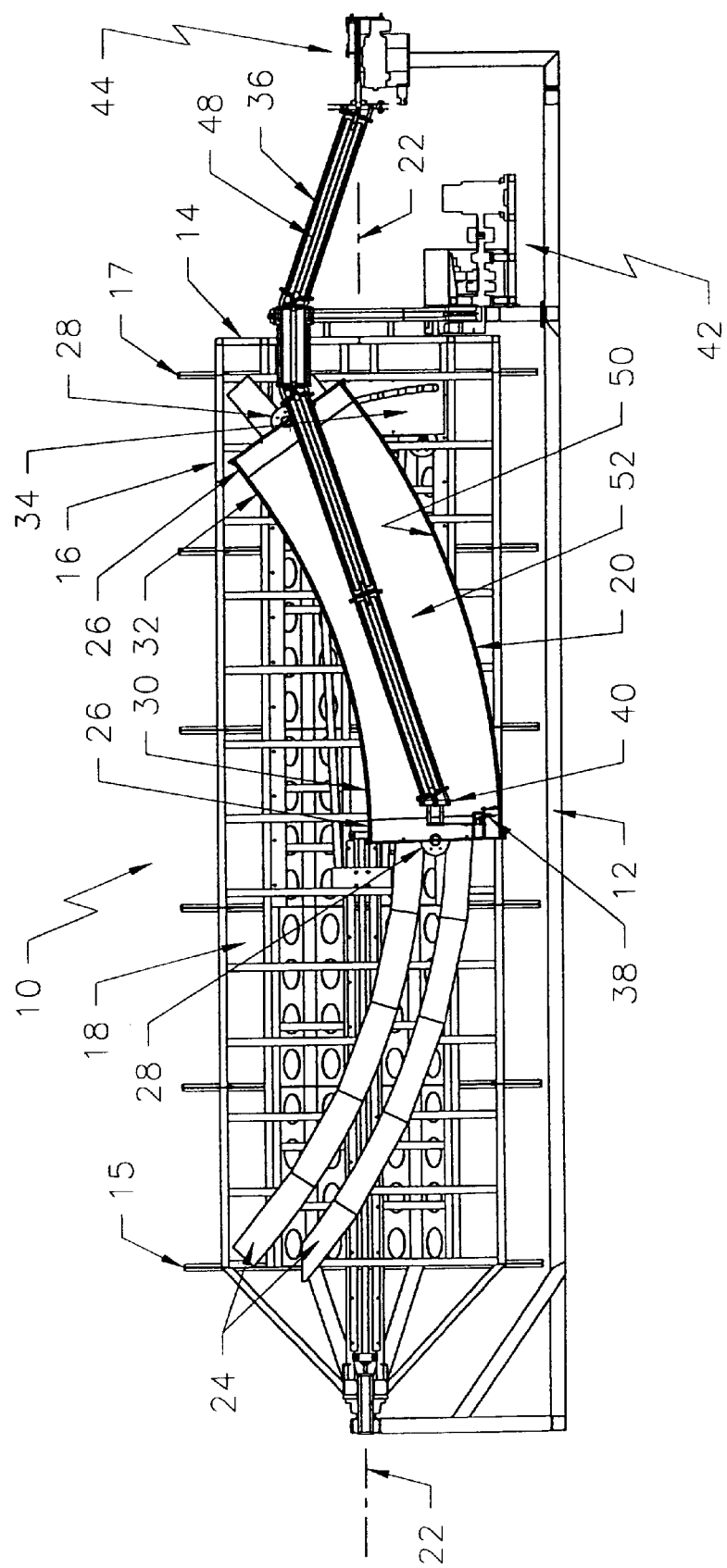
FIG. 4 is a side view in section of the apparatus for circumferential application of materials to the interior surface of the curved pipe shown in FIG. 1, at the completion of circumferential welding of overlay materials to an interior surface of the curved pipe.
Figure 5:
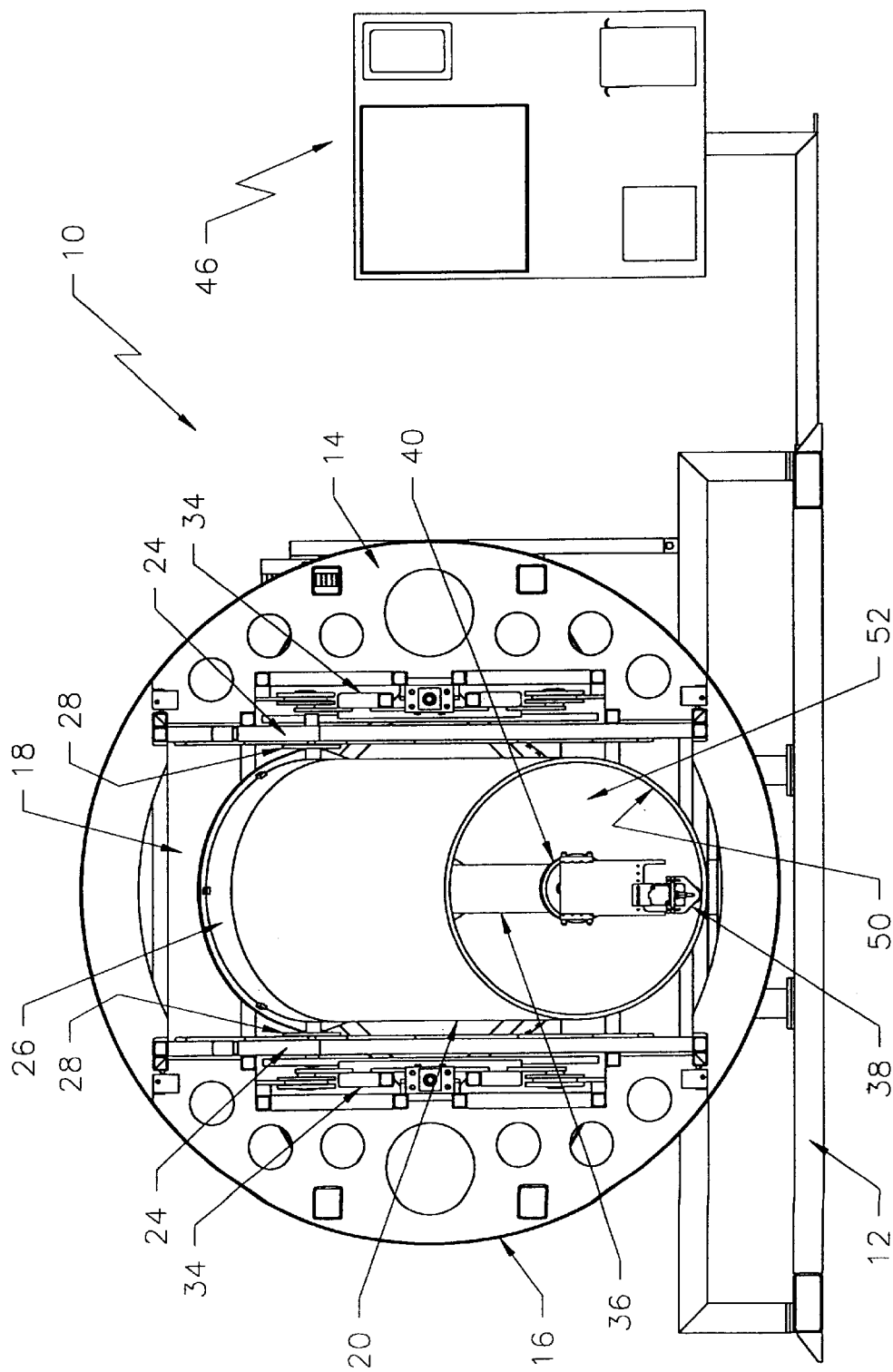
FIG. 5 is an end view of the apparatus for circumferential application of materials to the interior surface of the curved pipe shown in FIG. 1, with the welding head in position for starting circumferential welding of overlay materials to the interior surface of the curved pipe as shown in FIG. 2.
Figure 6:
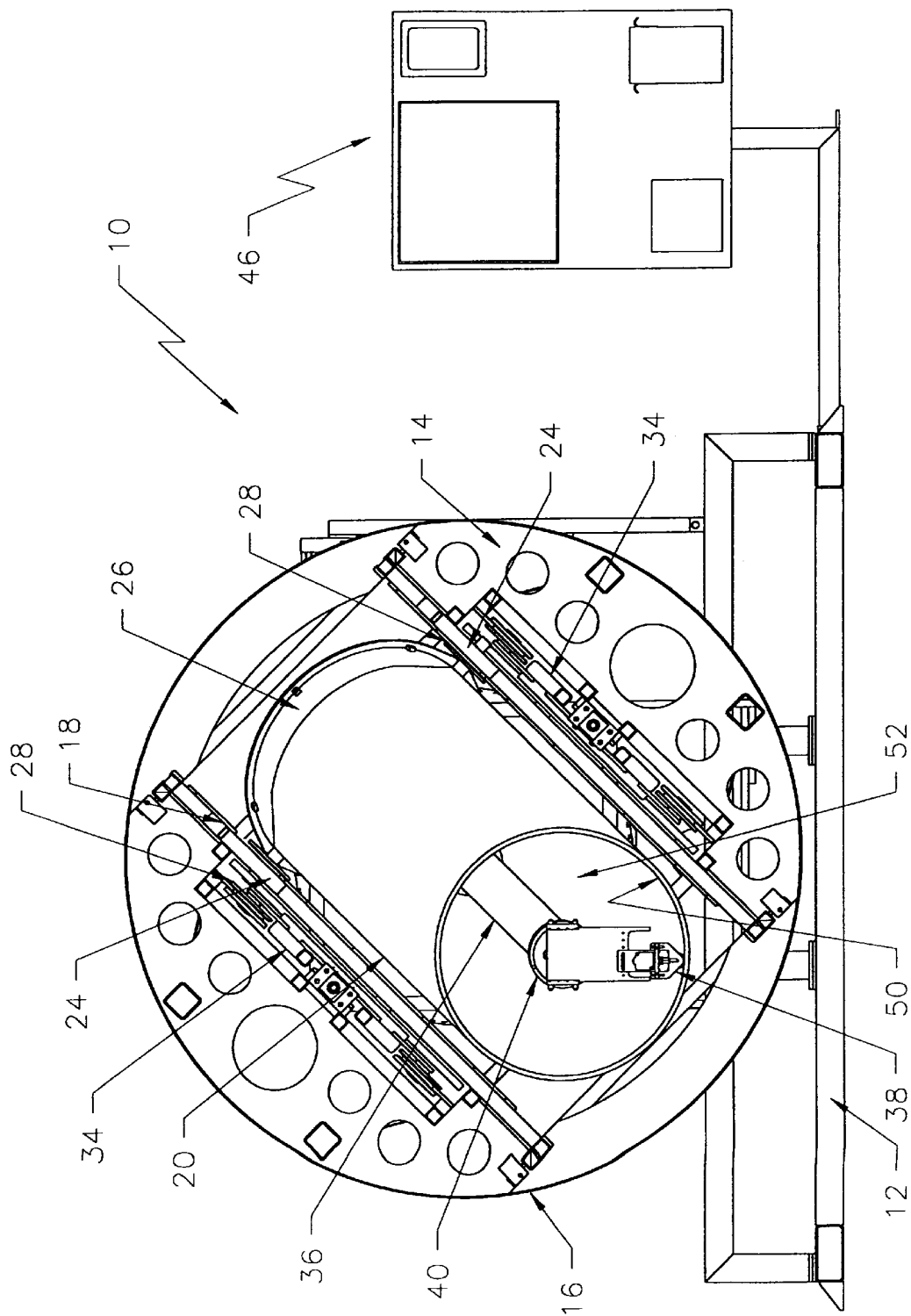
FIG. 6 is an end view of the apparatus for circumferential application of materials to the interior surface of the curved pipe shown in FIG. 1, with the welding head welding overlay materials to the interior surface of the curved pipe and the pipe support having been rotated 45 degrees from the starting position shown in FIG. 5.
Figure 7:
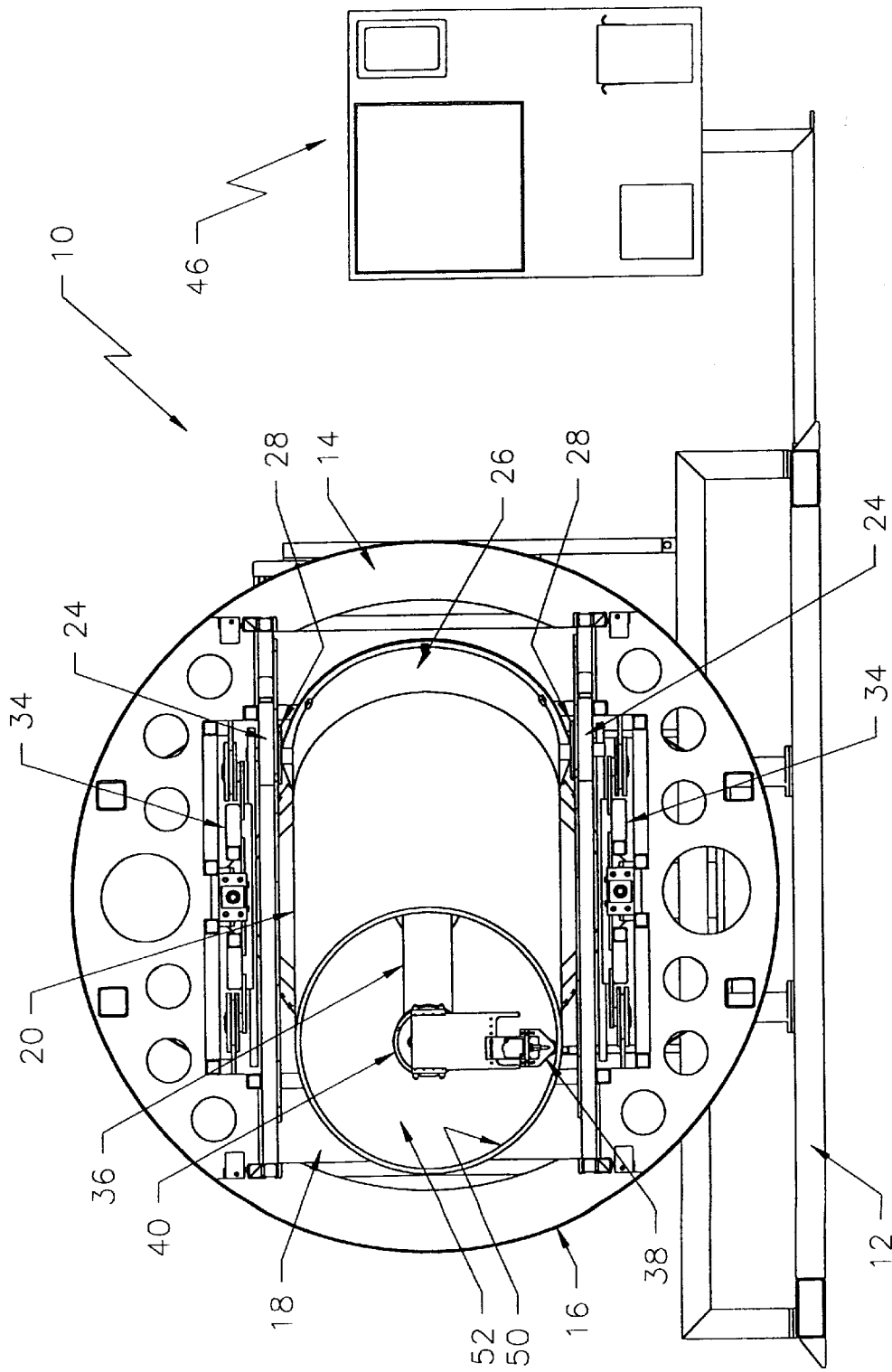
FIG. 7 is an end view of the apparatus for circumferential application of materials to the interior surface of the curved pipe shown in FIG. 1, with the welding head welding overlay materials to the interior surface of the curved pipe and the pipe support having been rotated 90 degrees from the starting position shown in FIG. 5.
Figure 8:
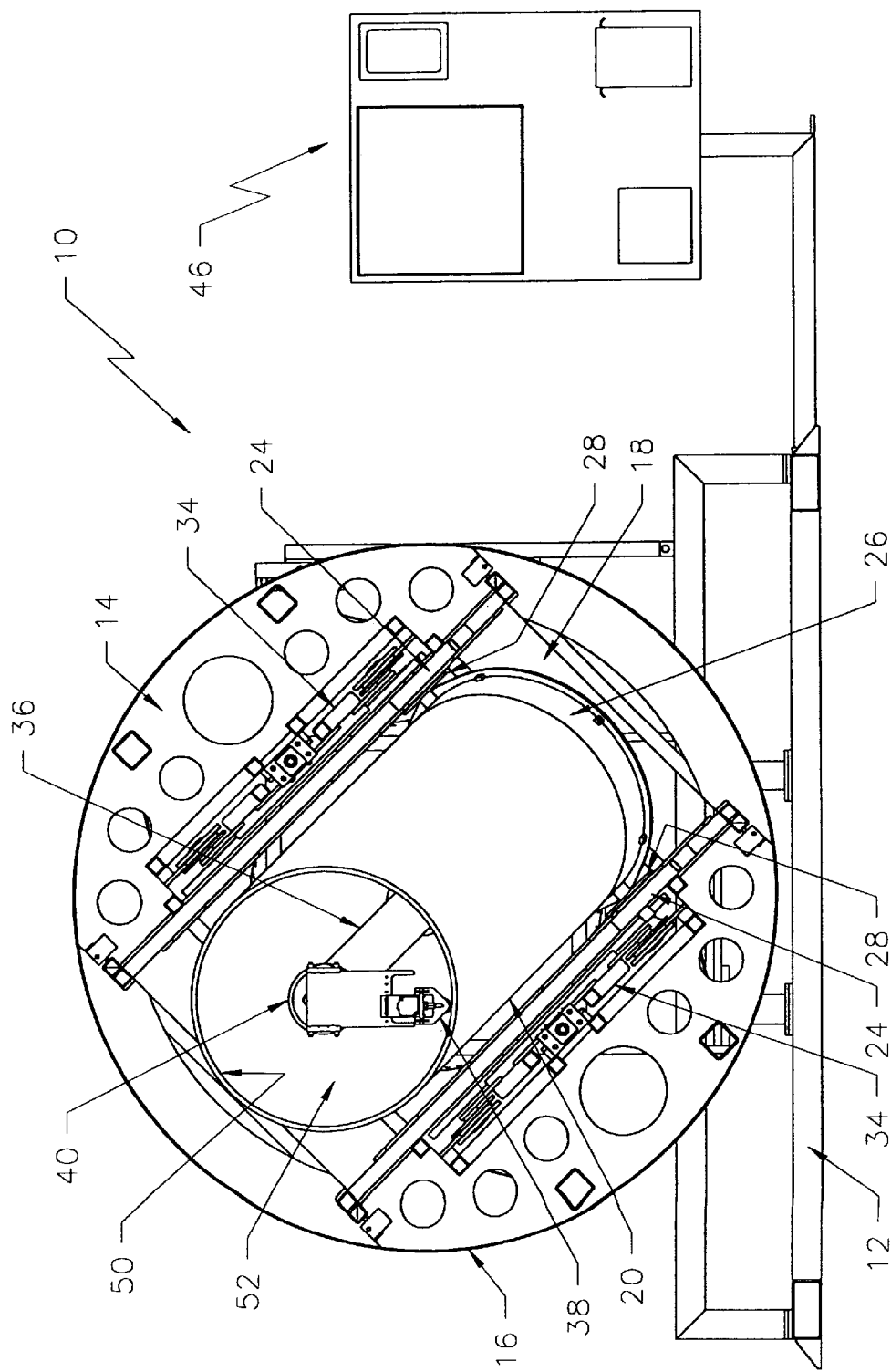
FIG. 8 is an end view of the apparatus for circumferential application of materials to the interior surface of the curved pipe shown in FIG. 1, with the welding head welding overlay materials to the interior surface of the curved pipe and the pipe support having been rotated 135 degrees from the starting position shown in FIG. 5.
Figure 9:
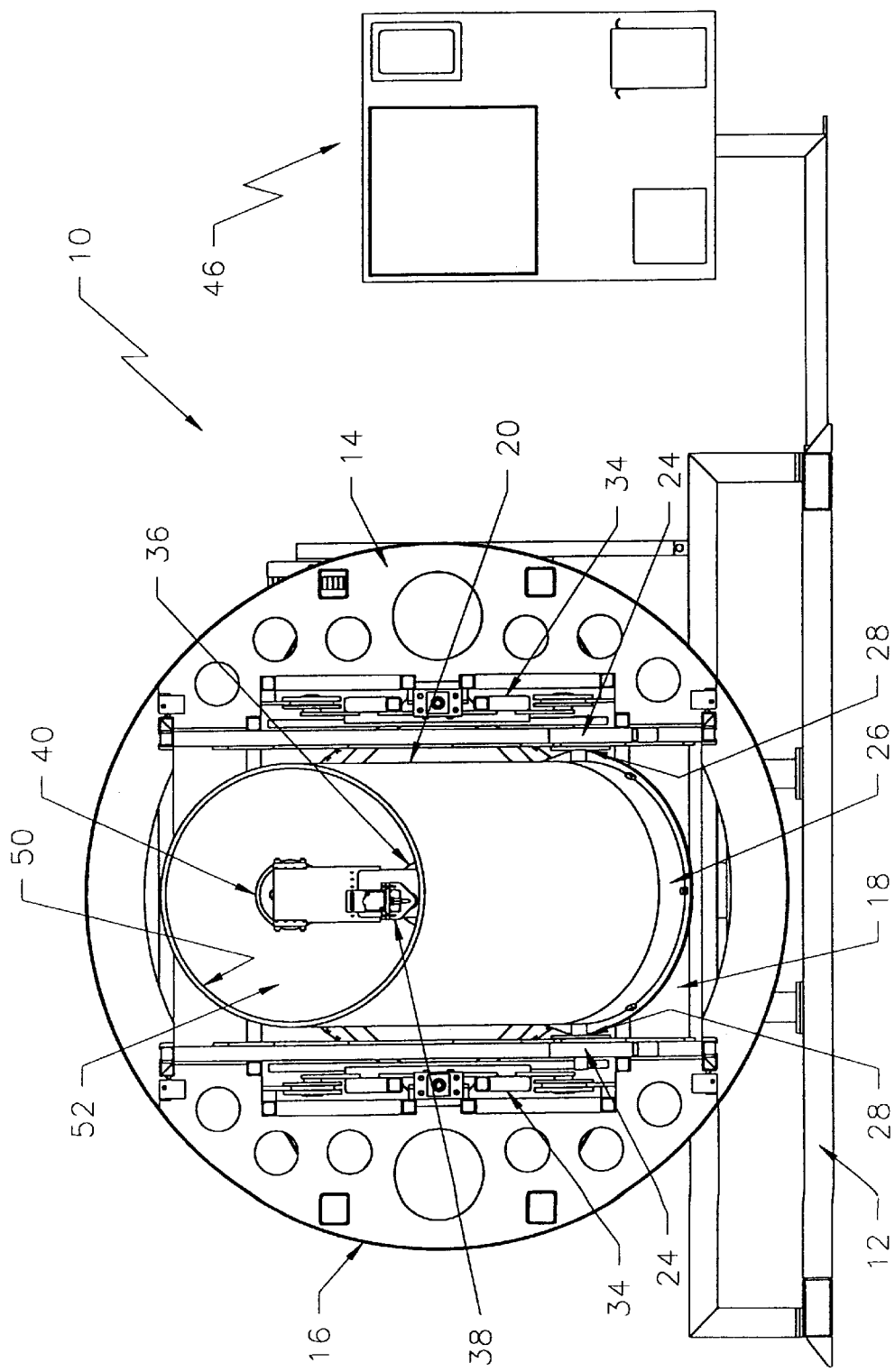
FIG. 9 is an end view of the apparatus for circumferential application of materials to the interior surface of the curved pipe shown in FIG. 1, with the welding head welding overlay materials to the interior surface of the curved pipe and the pipe support having been rotated 180 degrees from the starting position shown in FIG. 5.
Figure 10:
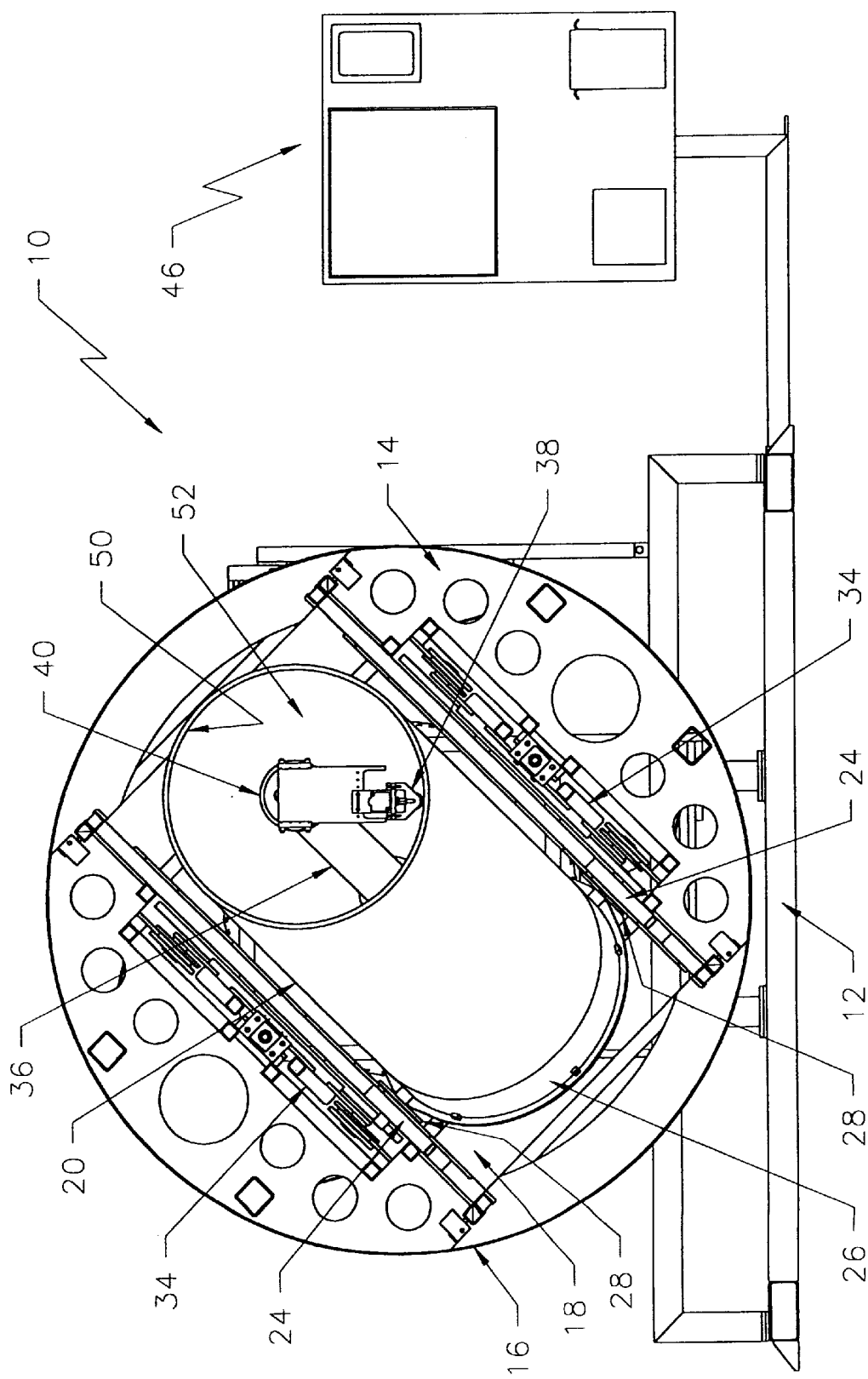
FIG. 10 is an end view of the apparatus for circumferential application of materials to the interior surface of the curved pipe shown in FIG. 1, with the welding head welding overlay materials to the interior surface of the curved pipe and the pipe support having been rotated 225 degrees from the starting position shown in FIG. 5.
Figure 11:
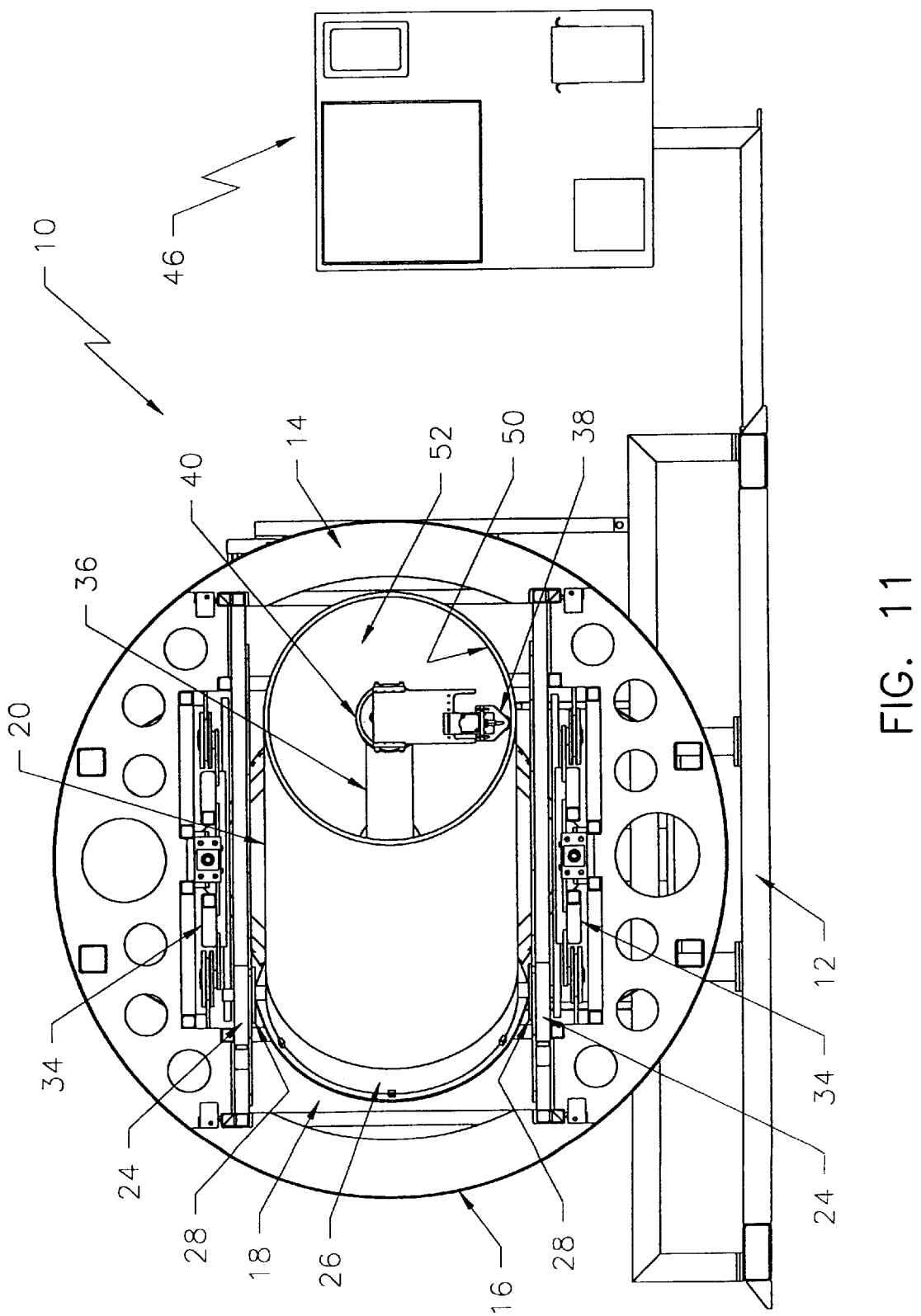
FIG. 11 is an end view of the apparatus for circumferential application of materials to the interior surface of the curved pipe shown in FIG. 1, with the welding head welding overlay materials to the interior surface of the curved pipe and the pipe support having been rotated 270 degrees from the starting position shown in FIG. 5.
Figure 12:
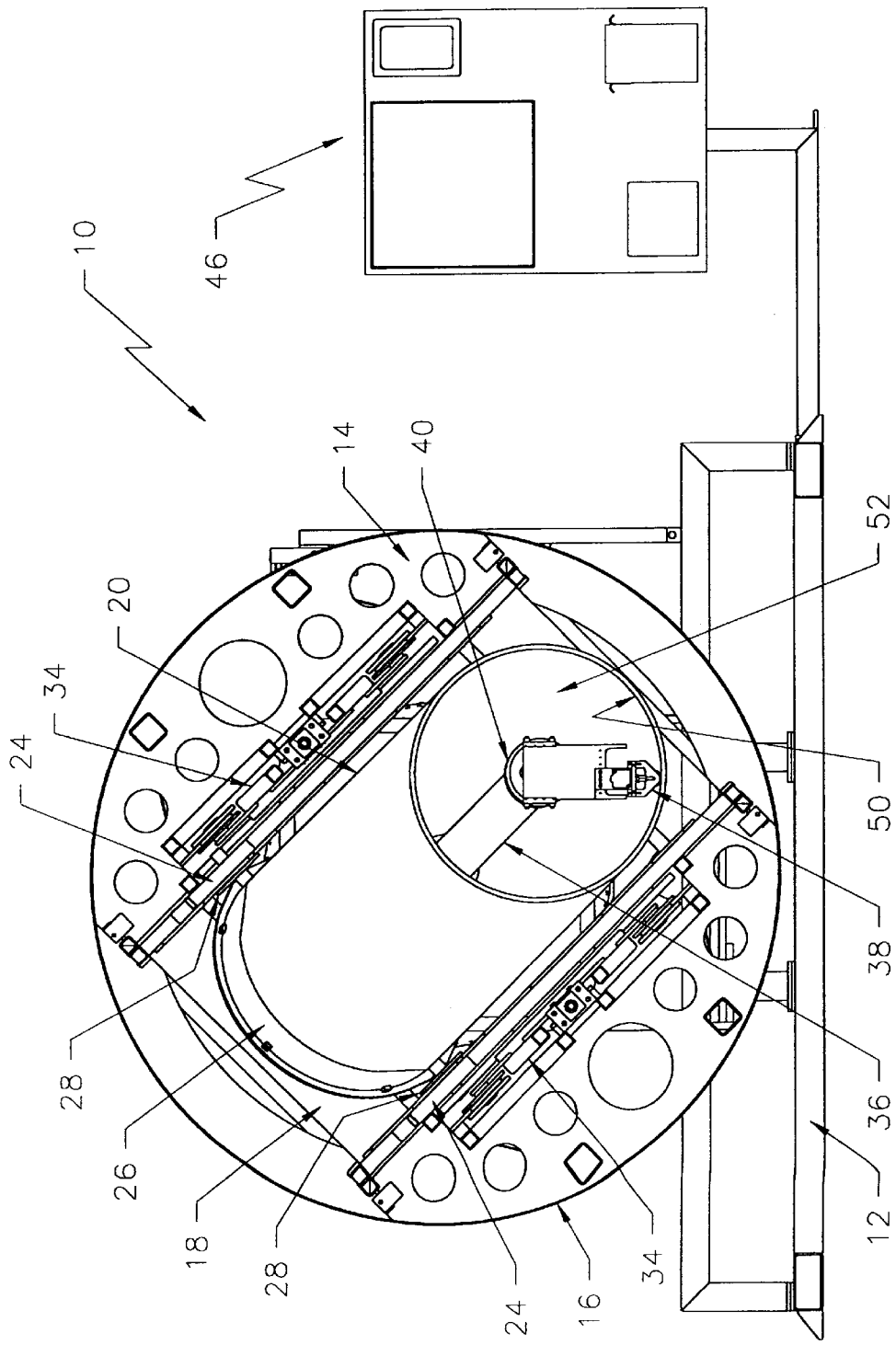
FIG. 12 is an end view of the apparatus for circumferential application of materials to the interior surface of the curved pipe shown in FIG. 1, with the welding head welding overlay materials to the interior surface of the curved pipe and the pipe support having been rotated 315 degrees from the starting position shown in FIG. 5.

The method for circumferential welding of overlay materials to an interior surface of a curved pipe will now be described with reference to FIGS. 1 through 22. Apparatus 10 is provided as illustrated in FIG. 1. Apparatus 10 includes pipe support 14 having rotational axis 22. A curved section of pipe 20 is fitted with collars 26 and mounted to pipe support 14. Arm 36 supporting welding head 38 is positioned within curved section of pipe 20 as illustrated in FIG. 2. Welding head 38 is moved to a selected position along interior surface 50 of curved section of pipe 20 by moving collars 26 along opposed guide tracks 24 using guidance source 34, as illustrated in FIGS. 2 through 4 and FIG. 18. The welding operation is performed by rotating pipe support 14 by means of rotational drive 42 as illustrated in FIGS. 5 through 12 and FIG. 14. Pipe support 14 is rotated about rotational axis 22. Guidance source 34 provides a linear pulling force along rails 37. Longitudinal guide rails 24 provide an arcuate guide path which compensates for the curvature of the pipe 20. Movement of arm 36 and applicator head 38 is coordinated with the rotation of pipe support 14 by a controller that has several aspects. A computer processor 46 is provided, as part of the controller to control such functions as speed of rotation of pipe support 14, but the majority of the control functions are performed by mechanical control linkages. Referring to FIG. 14, arm 36 rotates with pipe support 14 utilizing exterior housing 73 that moves with gear sprocket 71 in a fashion that resembles the movement of a skipping rope. A vertical positioning of applicator head 38 during rotational movement of pipe support 14 is maintained and controlled by flexible linkage 48. The oscillating amplitude of welding head 38 is adjusted as pipe support 14 rotates to compensate for differences in length of curvature of the pipe. Referring to FIGS. 21 and 22, this is controlled through the master to slave relationship between movable sensor 87 which oscillates between swash plates 83, 85 and oscillator drive 81. The rotational speed of pipe support 14 is controlled by processor 46 during welding to compensate for changes in the rate of application of welding bead due to variations in the oscillation amplitude. Through speed control the welding bead can either be made substantially uniform or can be adjusted to leave substantially more or substantially less of a deposit at specific rotational positions.

It will be apparent to one skilled in the art that modifications may be made to the illustrated embodiment without departing from the spirit and scope of the invention as hereinafter defined in the Claims.

The embodiments of the invention in which an exclusive property or privilege is claimed are defined as follows:

1. An apparatus for circumferential application of materials to an interior surface of a curved pipe, comprising:
    a base;
    a pipe support having a cavity adapted to receive a curved section of pipe, the pipe support being mounted to the base for rotation about a rotational axis;
    an arm extending into the cavity of the pipe support;
    an applicator head mounted to the arm;
    a rotational drive adapted to rotate the pipe support about the rotational axis; and
    a controller adapted to control rotational speed of the rotational drive and coordinate movement of the arm with the rotational positioning of the pipe support.

2. The apparatus as defined in claim 1, wherein the arm rotates with the pipe support.

3. The apparatus as defined in claim 1, wherein the controller coordinates the position of the applicator head with the rotational positioning of the pipe support.

4. The apparatus as defined in claim 1, wherein the pipe support includes longitudinal guides and guidance source adapted to move a curved section of pipe along the longitudinal guides.

5. The apparatus as defined in claim 4, wherein the longitudinal guides include guide tracks, the guide tracks engaging movable members which are adapted for attachment to a curved section of pipe, the guidance source being adapted to move the movable members along the longitudinal guides.

6. The apparatus as defined in claim 5, wherein the movable members have guide wheels that engage the guide tracks.

7. The apparatus as defined in claim 4, wherein several longitudinal guides are provided, each one of the several longitudinal guides being adapted to accommodate a curved section of pipe having a different curvature.

8. The apparatus as defined in claim 4, wherein the longitudinal guidance source applies a linear pulling force and the longitudinal guides provide an arcuate guide path to compensate for a curvature of the pipe.

9. The apparatus as defined in claim 1, wherein the rotational drive includes a drive motor which drives a pair of spaced driven sprockets which engage a gear sprocket on the pipe support, and thereby impart a rotational force to the pipe support.

10. The apparatus as defined in claim 1, wherein a linkage extends through the arm to the applicator head, the flexible linkage being adapted to control orientation of the applicator head.

11. The apparatus as defined in claim 1, wherein the applicator head oscillates with an amplitude of such oscillations being controlled by a movable sensor oscillating between a pair of angularly offset rotating swash plates carried by the rotating pipe support, the movable sensor having a master to slave relationship with an oscillating drive for the applicator head.

12. An apparatus for circumferential application of material to an interior surface of a curved pipe, comprising:
   a base;
   a pipe support having a cavity adapted to receive a curved section of pipe, the pipe support being mounted to the base for rotation about a rotational axis;
   an arm extending into the cavity of the pipe support;
   an applicator head mounted to the arm;
   a rotational drive adapted to rotate the pipe support about the rotational axis;
   a controller adapted to control rotational speed of the rotational drive and coordinate movement of the arm and the position of the applicator head with the rotational positioning of the pipe support; and
   the pipe support having longitudinal guides, movable members engaging the longitudinal guides, the movable members being adapted for attachment to a curved section of pipe, and a guidance source which provides a linear pulling force to the movable members, thereby moving the curved section of pipe along the longitudinal guides, the longitudinal guides providing an arcuate guide path to compensate for a curvature of the pipe.

13. The apparatus as defined in claim 12, wherein the longitudinal guides include guide tracks, and movable members have guide wheels that engage the guide tracks.

14. The apparatus as defined in claim 12, wherein several interchangeable longitudinal guides are provided, each one of the several longitudinal guides being adapted to accommodate a curved section of pipe having a different curvature.

15. The apparatus as defined in claim 12, wherein the rotational drive includes a drive motor which drives a pair of spaced driven sprockets which engage a gear sprocket on the pipe support, and thereby impart a rotational force to the pipe support.

16. The apparatus as defined in claim 12, wherein a linkage extends through the arm to the applicator head, the flexible linkage being adapted to control orientation of the applicator head.

17. The apparatus as defined in claim 12, wherein the applicator head oscillates with such oscillations being controlled by a movable sensor oscillating between a pair of angularly offset rotating swash plates carried by the rotating pipe support, the movable sensor having a master to slave relationship with an oscillating drive for the applicator head.

18. The apparatus as defined in claim 12, wherein the arm rotates with the pipe support.

19. An apparatus for circumferential application of materials to an interior surface of a curved pipe, comprising:
   a base;
   a pipe support having a cavity adapted to receive a curved section of pipe, the pipe support being mounted to the base for rotation about a rotational axis;
   an arm extending into the cavity of the pipe support, the arm being coupled for rotation with the pipe support;
   an oscillating applicator head mounted to the arm;
   an oscillating drive for oscillating the applicator head;
   a rotational drive adapted to rotate the pipe support about the rotational axis;
   a flexible control linkage adapted to coordinate movement of the applicator head with the rotational positioning of the pipe support and the arm, the flexible linkage being adapted to control orientation of the applicator head, the applicator head oscillating with such oscillations being controlled by a movable sensor oscillating between a pair of angularly offset rotating swash plates carried by the rotating pipe support, the movable sensor having a master to slave relationship with the oscillating drive for the applicator head;
   the pipe support having longitudinal guides, movable members engaging the longitudinal guides, the movable members being adapted for attachment to a curved section of pipe, and a guidance source which provides a linear pulling force to the movable members, thereby moving the curved section of pipe along the longitudinal guides, the longitudinal guides providing an arcuate guide path to compensate for a curvature of the pipe.

20. The apparatus as defined in claim 19, wherein the longitudinal guides include guide tracks, and movable members have guide wheels that engage the guide tracks.

21. The apparatus as defined in claim 19, wherein several interchangeable longitudinal guides are provided, each one of the several longitudinal guides being adapted to accommodate a curved section of pipe having a different curvature.

22. The apparatus as defined in claim 19, wherein the rotational drive includes a drive motor which drives a pair of spaced driven sprockets which engage a gear sprocket on the pipe support, and thereby impart a rotational force to the pipe support.

23. An apparatus for circumferential application of materials to an interior surface of a curved pipe, comprising:
   a base;
   a pipe support having a cavity adapted to receive a curved section of pipe, the pipe support being mounted to the base for rotation about a rotational axis;
   an arm extending into the cavity of the pipe support, the arm rotating with the pipe support;
   an applicator head mounted to the arm;
   a rotational drive adapted to rotate the pipe support about the rotational axis;
   a controller adapted to coordinate movement of the applicator head with the rotational positioning of the pipe support and arm;
   a linear longitudinal guidance source applying a linear pulling force which is adapted to move the curved section of pipe along the cavity;
   longitudinal guides providing an arcuate guide path adapted to guide movement of the curved section of pipe, the arcuate guide path compensating for a curvature of the pipe as the pipe support rotates and the linear pulling force is exerted by the longitudinal guidance source.

* * * * *